Patented Aug. 19, 1952

2,607,772

UNITED STATES PATENT OFFICE 2,607,772

PRODUCTION OF POWDERY PRODUCTS COMPRISING CARBOXYMETHYL CELLULOSE

Charles H. Rigby, Saltcoats, Scotland, assignor to Imperial Chemical Industries Limited, a corporation of Great Britain No Drawing. Application December 5, 1950, Serial No. 199,345. In Great Britain December 21, 1949

2 Claims. (Cl. 260—232)

The present invention relates to the production of water-soluble sodium carboxymethyl celluloses in powder form.

The object of the present invention is to produce water-soluble sodium carboxymethyl cellulose in powder form from a product resulting from the etherification of cellulose in fibrous form.

Sodium carboxymethyl cellulose is easily prepared by an etherification reaction between cellulose fibres, sodium hydroxide and sodium chloracetate in the presence of a limited amount of aqueous alcohol such that the product has the character of a mass of loose moist fibres. The presence of the alcohol minimises the swelling of the fibrous cellulose and also minimises the loss of etherifying agent by hydrolysis, and in the most economic formulae for the etherification the product obtained will usually contain from 60–75 parts water and from 70–85 parts alcohol for every 125 parts by weight of sodium carboxymethyl cellulose, the mixture containing also the by-product salts of which the greater part consists of sodium chloride, most of which is present in solid form.

The surplus sodium hydroxide in the aqueous alcohol moist product is converted into carbonate or other faintly alkaline or neutral salts; and the above mentioned figures for the water content take account of the water in presence of which the etherification is started, the water resulting from the etherification, and the water resulting from the removal of the caustic alkalinity, together with a small amount lost by evaporation, and the figures for the alcohol also allow for a certain loss by evaporation. The alcoholic strength reckoned on the sum of the weights of alcohol and water in the decausticised saline product is usually from 53–65%.

Whether the moist decausticised reaction product is dried off as such or extracted with an aqueous solution of a water miscible alcohol to remove the accompanying salts, there must be a sufficient alcoholic concentration to ensure that as evaporation proceeds the amount of water will not be sufficient to destroy the fibrous form of the sodium carboxymethyl cellulose, otherwise the particles would coalesce to form lumps difficult to dissolve in water. By maintaining the strength of the alcohol sufficiently high a dried fibrous product of open texture is obtained. If the salts are washed out from the fibrous product with further amounts of the aqueous solution of the water miscible alcohol it may be necessary to increase the strength of the alcohol as the salts are washed away in order to keep the product fibrous.

Before drying the undesired excess of the aqueous solution of the water miscible alcohol introduced by the washing operations should be removed so far as is practicable e. g. by centrifuging.

It is often required, however, to form a mixture of decausticised dried sodium carboxymethyl cellulose with solid powdery materials, but it is almost impossible to do this even after mechanical disintegration of the dried product so prepared because the mechanical disintegration does not destroy the fibrous structure although it reduces the length of the fibres.

I have now found that by directing on to a loose mass of mechanically agitated water-soluble sodium carboxymethyl cellulose fibres, moist with an aqueous solution of a water miscible alcohol containing water and the alcohol in proportions such that it will dry to a loose fibrous product, a dispersed stream of aqueous liquid wholly in mist or vaporous condition, until the amount of water introduced is sufficient to cause incipient gelation at the surfaces of the individual fibres, but insufficient to destroy the loose texture of the mass, the latter can be dried off while preserving its open condition, but when the so dried material is mechanically disintegrated it readily loses its fibrous form and the disintegrated material can easily be mixed with solid powders.

According to the present invention the method for converting into a free-flowing powder a loose fibrous mass comprising a water-soluble sodium carboxymethyl cellulose moist with an aqueous solution of a water miscible alcohol containing water and the alcohol in proportions such that it will dry to a loose fibrous product comprises directing on to said mass while it is being agitated a dispersed stream of aqueous liquid until the amount of water introduced is at least sufficient to cause incipient gelation at the surface of the individual fibres but insufficient to destroy the loose texture of the mass, substantially drying the thus treated mass, and mechanically disintegrating into powder form the substantially dried mass thus produced.

Air- or pressure-spray apparatus may be used to form and direct the mist of aqueous liquid, but when steam is used, dry steam is advantageously delivered and directed by a pipe whose orifice is of substantial area as distinct from the constricted orifices applicable in the case of the liquid. Many types of mechanical disintegrator may be employed for the dry mass of open texture to be pulverised. Multi-hammer attrition mills and rotating opposed pin disc machines have been found particularly convenient.

In the case of the decausticised material prepared in the aforesaid manner and still containing the byproduct salts it will usually be necessary to introduce some 15–40 parts water for every 125 parts sodium carboxymethyl cellulose and when the ethyl alcohol is used the product to be dried will normally contain alcohol of strength from 40–50% by weight.

It may be noted that the water sprayed into the product could not be introduced into the etherification mixture before the etherification step without rendering the process somewhat wasteful and would not produce the same physical condition of product combining the advantages of easy drying and pulverisability.

On the whole the tendency is for the optimum quantity of water required to be sprayed in to be the higher the higher the viscosity of the cellulose ether and to be higher the lower the degree of substitution.

As the water-miscible alcohol there may be used for example methyl alcohol, ethyl alcohol or isopropyl alcohol. The range of alcoholic concentrations in which the sodium carboxymethyl cellulose exhibits the required state of incipient gelation is wider for isopropyl alcohol than for the ethyl alcohol, and wider for ethyl alcohol than for methyl alcohol, and this renders the attainment of the desired water content of the mixture by the water spraying operation somewhat more easy in practice in the case of ethyl alcohol than in the case of methyl alcohol, and still more easy in the case of isopropyl alcohol. However, at higher alcoholic concentrations than those in which there is incipient gelation the fibrous sodium carboxymethyl cellulose is harsher to the touch and somewhat more easily handled when ethyl alcohol or methyl alcohol is used than when isopropyl alcohol is used, and in washing out by-product salts the higher solubility of these salts in aqueous methyl alcohol and ethyl alcohol of alcoholic content sufficient for maintenance of the fibrous form than in isopropyl alcohol of such alcoholic content facilitates the removal of these salts. On the whole it is preferred to use ethyl alcohol.

The free flowing powder resulting from the process not only mixes very easily with other powdery materials but also dissolves very readily in water. In this way useful compound preparations for example detergent powders, foodstuff preparations and so forth may conveniently be made.

The invention is illustrated in the following examples in which the parts and percentages are by weight.

*Example 1*

90 parts of sulphite woodpulp chips cut into the form of squares of ⅛ inch size and containing 8% moisture is loaded into a Werner-Pfleiderer type incorporator and to this is added, after the machine has been started, 45 parts of flake caustic soda, 50 parts industrial ethyl alcohol of 7% water content and 37 parts water. The mixture is shredded and aged under conditions favouring substantial reduction in viscosity. Thereupon 50 parts of the same industrial alcohol are added, 38 parts of monochloracetic acid are next added and mixing is continued for a further hour with cooling. The temperature is then raised to 60° at which temperature the mixture is maintained for two hours to complete the reaction and effect some further reduction in the viscosity of the product. The reaction product is cooled to 30–35° C. over a period of about half an hour and 28 parts sodium bicarbonate are incorporated into it in order to convert the excess sodium hydroxide into sodium carbonate. A mist of 28 parts of water is next sprayed into the product, which is still being agitated in the incorporator. For this purpose an air atomiser is employed to disperse and distribute the water as uniformly as possible on to the moist fibres constituting the batch. After this quantity has been sprayed in it is observed that there is a slight tendency for the fibres when pressed together in the hand to adhere. The fibrous product is then discharged from the incorporator and dried in thin layers at a temperature of 60–100° C. until the moisture content is reduced to less than 10%. The dried material is then mechanically disintegrated in a mill of the opposed pin-bearing wheel type as a result of which the fibrous form disappears and the product becomes a fine powder of which 94% passes through a 100 mesh British Standard sieve screen. The product mixes very easily with pulverised sodium sulphate or pulverised sodium carbonate without any tendency to segregate on subsequent shaking. The viscosity of a 2% aqueous solution is 7 centipoises and the degree of substitution is 0.49 sodium carboxymethyl groups per anhydroglucose unit of cellulose.

A product etherified in the same manner, but from which the water spraying is omitted, yields when dried and mechanically disintegrated a finely divided fluffy fibrous product which does not mix intimately with any of the above mentioned solids.

*Example 2*

90 parts of sulphite woodpulp chips as used in Example 1 is loaded into a Werner-Pfleiderer type incorporator and to this is loaded after the machine has been started, 45 parts of flake caustic soda, 50 parts of industrial ethyl alcohol of 7% water content and 27 parts of water. The mixture is shredded together for 2½ hours with cooling, the temperature falling below 30° C. At this stage 50 parts of the same industrial ethyl alcohol is added and then a total of 34 parts of monochloracetic acid is added. Mixing is continued for a further hour with cooling and the temperature is then raised to 60° C., at which temperature the mixture is maintained for ¾ hour to complete the reaction.

The reaction product is cooled to 30–35° C. and then stirred into a slurry with 1500 parts of 55% industrial alcohol. The surplus caustic soda in this slurry is neutralised by the careful addition of 50% nitric acid and the neutral slurry is centrifuged. The product is then sprayed in the centrifuge with 600 parts of 55% industrial alcohol and centrifuging is continued until no further aqueous alcohol streams away.

The cake is removed from the centrifuge and mechanically rubbed through a grid having apertures of ⅜ inch size.

150 parts of the resulting product, which contains 68 parts 55% industrial alcohol and 82 parts sodium carboxymethyl cellulose, are loaded into a Werner-Pfleiderer type incorporator and while this is being mixed 40 parts water are uniformly distributed over the surface of the fibres of the mass by means of an atomiser.

The product at this stage is discharged from the incorporator and dried at 100° C. until the moisture content has been reduced to below 10%.

The dried product is disintegrated through the same type of mill as used in Example 1. This disintegration completely destroys the fibrous form and yields a fine free flowing powder 80% of which passes through a 100 mesh B. S. S. screen.

The viscosity of a 1% aqueous solution is 58 centipoises and the degree of substitution is 0.50 sodium carboxymethyl group per anhydroglucose unit of cellulose. This product mixes easily with powdered sodium bicarbonate or flour without tending to segregate on shaking the mixture.

*Example 3*

Sodium carboxymethyl cellulose is prepared, sprayed with a water mist and is dried by exactly the same procedure as in Example 2. In this case the dried product is disintegrated in a multi-hammer mill through a grid containing 1/2 inch diameter circular perforations. The resulting product is a fine powder 82% of which is capable of passing through a 100 mesh B. S. S. screen. This product mixes easily with flour, powdered sodium sulphate or powdered sodium carbonate without tending to segregate on subsequent shaking.

What I claim is:

1. A process for producing sodium carboxymethyl cellulose in the form of a free-flowing powder comprising agitating a loose fibrous mass comprising a water soluble sodium carboxymethyl cellulose moist with an aqueous alcohol and containing water and alcohol in such proportions that the mass would normally dry to a loose fibrous product, simultaneously introducing thereto a dispersed stream of aqueous fluid until the amount of water introduced is at least sufficient to cause incipient gelation at the surface of the individual fibers but insufficient to destroy the loose texture of the mass and render a solution, substantially drying the thus treated mass and mechanically comminuting the substantially dried mass thus produced.

2. A method as claimed in claim 1 wherein the said dispersed stream of aqueous fluid is in a form selected from the group consisting of mist and vapor.

CHARLES H. RIGBY.

REFERENCES CITED

The following references are of record in the file of this patent:

UNITED STATES PATENTS

| Number | Name | Date |
| --- | --- | --- |
| 1,507,210 | Seel | Sept. 2, 1924 |
| 2,288,200 | Meyer | June 30, 1942 |
| 2,331,864 | Swinehart | Oct. 12, 1943 |
| 2,510,355 | Waldeck | June 6, 1950 |
| 2,513,725 | Houghton | July 4, 1950 |